United States Patent Office 3,010,840
Patented Nov. 28, 1961

3,010,840
WATER REPELLENT AGGREGATE
David C. Goff, Fort Lauderdale, Fla., and George E. Ziegler, Evanston, Ill., assignors to Zonolite Company, Chicago, Ill., a corporation of Montana
No Drawing. Filed June 8, 1959, Ser. No. 822,707
5 Claims. (Cl. 117—21)

The present invention relates to an improved method of producing water repellent aggregates and more particularly relates to producing light weight water repellent aggregates for use with cementitious materials. In the past attempts have ben made to render light weight aggregates water repellent by the use of emulsified asphalt and other thermo plastic material dispersed in water by the method of depositing the emulsion on heated aggregate.

Emulsified water repellent materials are expensive compared to the same quantity of material in a solid state. It is also frequently difficult to disperse in water organic materials that thave the highest waterproofing action. The water repellent characteristics automatically make dispersion troublesome. Frequently, much of the waterproofing ability of the material is destroyed by the surface active additives needed to estabilsh and maintain a water suspension.

Efforts also have been made to coat aggregates by exposing granules of the aggregates to air suspended molten water repellent materials. This procedure is troublesome because of the difficulties of handling the relatively sticky aggregate and because of agglomeration resulting from the use of molten materials which are usually tacky.

Light weight aggregates and in particular expanded vermiculite have been coated with particulated solid water repellents as shown in U.S. Patent Number 2,397,083 issued to Harry T. Bellamy. An undercoat or sticking agent such as petrolatum is required in this method in order to attain adherence of the particulated water repellent coating to the vermiculite. The carry over of the sticking agent in the final product to the extent of approximately 10% by weight of the vermiculite is objectionable, especially when the water repellent aggregate is to be used as an ingredient in insulating concrete for heated pipes. There is always danger that the sticking agent can produce or release combustible vapors.

It is therefore a first and principal object of our invention to render aggregates water repellent by applying solid water repellent materials to aggregate.

Another object is to eliminate the need for a sticking agent to secure adherence of the solid water repellent material to the aggregate.

A further object is to produce a water repellent aggregate low in combustible volatiles.

A further object is to produce insulating concrete of increased resistance to the migration of water.

A still further object is to produce gypsum plaster mixes having improved "take up" characteristics.

Many and further objects of the invention as well as advantages and features thereof will be apparent from the discussion of the invention which follows, and it will be understood moreover, in said discussion which more specifically describes the invention, that the same is not to be taken in a limiting sense but merely as illustrative of the invention, the metes and bounds of what is to be considered patentable therein being defined by the appended claims.

Petroleum asphalt and coal tar pitch are excellent water repellent materials and very low in cost. Thus it is only natural that much work has been done in the development of methods to use molten asphalt and coal tar pitch and particulated solids of asphalt and coal tar pitch as water repellent coatings for light weight aggregates such as expanded vermiculite, expanded perlite, expanded shale and clay or expanded slag. All of the light weight aggregates are relatively porous and have large surface area which results in substantial absorption of molten materials and the consequent inefficient use of the water repellent materials when coating with the molten material is attempted. This fact limits the use of molten materials to attain water repellent compositions.

In our first attempts to utilize the economies of particulate water repellent materials, we experienced the same non-adhesion of the dry particulate material to the dry aggregate which had been reported by others. We found, however, that it was possible to get good water repellency by first dry mixing the light weight aggregate with air floated pitch and then heating the mixture to fuse the pitch into an apparently continuous water repellent layer.

Air floated coal tar pitch is a material commonly used in foundry technology. A typical sample has the following sieve analysis.

| Mesh size: | Percent retained |
|---|---|
| 40 | 1.1 |
| 70 | 4.7 |
| 100 | 5.1 |
| 140 | 7.1 |
| 200 | 6.8 |
| 270 | 5.4 |
| Through 270 | 69.8 |
| | 100.0 |

Melting point 293° F. by the cube and air method

| | Percent |
|---|---|
| Fixed carbon | 46.94 |
| Ash | 0.20 |

Our experiments indicate that mesh size is important in the practice of our invention and an appreciable fraction, at least about 75%, of the material must pass through the 200 mesh screen if the aggregate is to be successfully coated. Commercially, at the present time, only coal tar pitch is available in the required sieve size. If petroleum asphalt of a particle size distribution comparable to the coal tar pitch were available, it would be equally effective in the practice of our invention. Somewhat higher fusion temperature would be required with particulated asphalt.

As a specific example of one way of carrying out our invention, we place 4 cu. ft. of expanded vermiculite aggregate of a size that meets ASTM specifications for Light Weight Aggregates for Insulating Concrete (C332) weighing approximately 30 lbs. in a closed rotary mixer. To this we add 15 lbs. of air floated pitch and mix for one minute. At this stage of the process the powdered pitch is well adhered to the particles of vermiculite. Little or no free powdered pitch is in evidence. The mixture is then heated to fuse the pitch adhering to the particles of vermiculite. The temperature is dependent on the method of heating and the length of time the vermiculite particle is in contact with the source of heat. For laboratory experiments an oven at 450° F. proved particularly convenient with the load being left in the oven until oven temperature was attained. In production it is particularly convenient to heat the vermiculite with a stream of hot air while the mixture is in a fluidized state with the fluidizing gas at a temperature in the range from 400° to 2000° F. Also the passing of the mixture through a conventional rotary drier or kiln operating at about 500° F. is very satisfactory.

Both coal tar pitch and petroleum asphalt are referred to commercially as bituminous materials. This term for these materials will be used in explaining our invention.

In a preferred form of our invention, the process of adding particulated bituminous materials to the expanded light weight aggregate is carried out by sifting the dry particulated bituminous material onto a bed of moving aggregate as the aggregate emerges from the expanding furnace in which it has been produced. One method of achieving the motion of the bed consists of allowing the hot aggregate to cascade down an inclined chute located so as to receive the aggregate from the discharge outlet of the expanding furnace. Another method of achieving the motion of the bed is through the utilization of a rotary drum arranged with its axis of rotation inclined downward from the discharge of the furnace. Any convenient mechanical means may be used to stir the bed of aggregate and to move the bed forward.

In this preferred method, the thermal energy content of the hot aggregate melts the surface of the granule of bituminous material sufficiently to cause it to adhere to the particle of aggregate. The motion of the bed causes the major adherence to take place in the pores and crevices of the aggregate particle. Thus the aggregate remains free-flowing and free from tendency to become a sticky mass. In this regard, our invention is entirely different from the familiar procedure of adding molten bituminous materials to aggregate. With vermiculite and perlite aggregates, particulated bituminous materials can be added in quantities up to 75% of the weight of the aggregate without the mass becoming sticky or agglomerated. We have found that the addition of bituminous materials in quantities less than approximately 0.5 pound for each cubic foot of aggregate results in too small a degree of waterproofing to be considered practical for most industrial applications requiring water repellent aggregates. The preferred range of bituminous material is in the range from 5 to 60% by weight of the expanded lightweight aggregate.

As a specific example, an efficient and economical water resistant aggregate results from sifting 10 lbs. of minus 30 mesh size granulated petroleum asphalt onto 4 cubic feet of expanded vermiculite or perlite in a rotary mixer adjacent to and inclined downward from the outlet of the expanding furnace. The temperature of the aggregate as it emerges from the expending furnace in the commonly used types of furnaces is in the 500° F. to 1200° F. range which is adequate to cause the bituminous material to adhere to the aggregate and to fuse in the pores or crevices which are locations within the aggregate particle which need waterproofing. Vermiculite and perlite are frequently heated to 2000° F. or higher during the expansion process, but the discharge temperature is normally well below this figure. Expanded slag usually discharges from the expanding unit at a lower range of temperature because steam or water is injected in the process to cause expansion. The temperature of the slag at the discharge outlet is in the range of 200° F. to 1000° F. Expanded clay or shale is usually discharged at higher temperature than the perlite, vermiculite or slag. A discharge temperature in the range of 1000° F. to 2300° F. is quite normal.

An air stream at the discharge outlet quickly cools the aggregate. This may be needed as a fire safety measure when excessively high discharge temperatures are experienced.

An important part of our invention is the discovery that the adherence of the bituminous material to the dry aggregate is dependent on particle size of the bituminous material and the temperature of the aggregate. As the temperature of the aggregate is increased, the maximum particle size at which reliable adherence occurs increases. For example, at room temperature bituminous material having very small particle size, approximately 80% by weight of particle size less than 200 mesh, is required for adhesion. If the temperature of the aggregate is in the 500° F. to 1200° F. range, bituminous materials of relatively large particle size, −30 to +60 mesh size, adheres well. Intermediate bituminous material particle size ranges are effective for aggregate in the temperature range of room temperatures to 500° F.

An economic advantage results from the use of as large particle size material as possible because the cost of producing particulated bituminous materials increases as the particle size diminishes.

The effectiveness of our treatment in making the aggregate water repellent is shown by capillary absorption measurements on the treated aggregate by the Hilgard water retention cup procedure used in soil studies. In this procedure the capillary absorption is measured in a standard cup having a screen bottom placed in contact with a surface of water and the increase in weight by capillary absorption is observed.

By this method the untreated expanded vermiculite aggregate had an absorption of 450% of the dry weight of the vermiculite. The treated product had an absorption of 15%. The thirty fold difference in absorption is a clear indication of the effectiveness of the treatment.

As another example, 10 lbs. of a small particle size expanded vermiculite was dry mixed in a paddle mixer with 3 lbs. of air floated pitch and then heated in an oven to approximately 500° F. The vermiculite before treatment had a Hilgard water retention cup value of 275% of dry weight after treatment the value was 35%. Concrete made with the treated vermiculite of the first example exhibits increased resistance to the migration of water compared to the same mix with untreated aggregate.

The following table compares two mixes of concrete differing only in aggregate.

*Table I*

| | Treated Aggregate | Untreated Aggregate |
| --- | --- | --- |
| Amount of aggregate, cubic feet | 6 | 6 |
| Portland cement, pounds | 94 | 94 |
| Mixing water, gallons | 19 | 21 |
| Waterproofing admix for Portland cement, gallons | 2 | 2 |
| Oven dry density, lbs./cu. ft | 27 | 27 |
| Time to first run through (water migration test), days | 19 | 3 |

The waterproofing admix for the Portland cement is standard cement mix emulsified asphalt sold commercially for this purpose. The "time to first run through" is a water migration resistance test performed by surrounding a hollow cylinder of concrete with water and observing the comparative times required for a given quantity of water to make its first appearance in the hollow space of the cylinder. The hollow space is closed to prevent evaporation.

In Table I the three day run through period for the untreated aggregate and the nineteen day period for the treated aggregate shows the effectiveness of our treatment to produce aggregate and concrete of increased water resistance.

Our invention results in gypsum plaster mixes of improved characteristics. When untreated vermiculite is used as an aggregate in calcined gypsum plaster mixes, a difficulty known to the plastering trade as "take up" occurs. "Take up" is a stiffening of the wet mix which results from the passage of the water out of the gypsum mix into the particles of vermiculite. If there is a delay of as much as 45 minutes after mixing before using a gypsum-vermiculite-water batch, the stiffening with untreated vermiculite can be severe enough to require the addition of water and remixing before the batch can be used. This retempering as it is called is very undesirable to the plasterer. With the use of the water repellent aggregate the hold up time before the stiffening makes the batch unworkable is about doubled. This extra time is adequate to take care of all reasonable demands of the plasterer as far as "take up" is concerned.

In general, expanded perlite, expanded clay and shale and expanded slag are less porous than vermiculite and are correspondingly easier to render water repellent. We have found that dry mixing air floated pitch with the aggregate followed by heating produces aggregates which are highly water repellent.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

We claim:

1. The method of producing a water repellent aggregate which comprises mixing an expanded, dry lightweight aggregate at room temperature with dry finely divided bituminous particles having a particle size such that at least 75% will pass through a 200 mesh screen until said particles adhere to particles of said aggregate, the amount of particles being at least 0.5 pound per cubic foot of aggregate but not more than 75% by weight of the aggregate, and heating said bituminous particles to a temperature sufficient to fuse said bituminous particles on to said aggregate particles, cooling the coated particles, and recovering free flowing coated aggregate particles.

2. The method of claim 1 in which said aggregate is expanded vermiculite.

3. The method of claim 1 in which said aggregate is expanded perlite.

4. The method of claim 1 in which said aggregate is an expanded clay.

5. The method of claim 1 in which said aggregate is an expanded slag.

References Cited in the file of this patent

UNITED STATES PATENTS

| | | |
|---|---|---|
| 1,972,390 | Miner | Sept. 4, 1934 |
| 2,009,811 | Olsen | July 30, 1935 |
| 2,009,812 | Olsen | July 30, 1935 |
| 2,077,094 | Byers | Apr. 13, 1937 |
| 2,397,083 | Bellamy | Mar. 26, 1946 |
| 2,774,383 | Kidd | Dec. 18, 1956 |
| 2,824,022 | Suchetti | Feb. 18, 1958 |
| 2,935,412 | Gzemski et al. | May 3, 1960 |